United States Patent

Föhl et al.

[11] 4,258,887
[45] Mar. 31, 1981

[54] SAFETY BELT ROLL-UP DEVICE

[75] Inventors: Artur Föhl, R.R. #2, Schorndorf; Wolf-Dieter Hönl, Nutlangen; Helmut Seifert, Schwäbisch Gmünd, all of Fed. Rep. of Germany

[73] Assignee: REPA Feinstanzwerk GmbH, Alfdorf, Fed. Rep. of Germany

[21] Appl. No.: 59,633

[22] Filed: Jul. 23, 1979

[51] Int. Cl.³ .................. A62B 35/02; B65H 75/48
[52] U.S. Cl. .......................... 242/107.4 A; 242/107.4 B
[58] Field of Search ................ 242/107.4 R–107.4 E; 280/803–808; 297/478, 480

[56] References Cited

U.S. PATENT DOCUMENTS 3,787,002  1/1974  Hayashi et al. ............ 242/107.4 B X
3,991,953  11/1976  Takada ..................... 242/107.4 A
4,065,069  12/1977  Weman ..................... 242/107.4 A Primary Examiner—John M. Jillions
Attorney, Agent, or Firm—Herbert L. Lerner; Laurence A. Greenberg

[57] ABSTRACT

Safety belt roll-up device with a release mechanism which in case of danger activates a control disk and locking means which block the belt shaft. A cam having an actuating dog for actuating the control disk and rotatable relative thereto. A spring holds the dog in a predetermined starting position relative to the control disk, which spring can be deflected resiliently relative to the control disk in opposite directions of rotation. Because of its ability to be deflected in oppsite directions, a single type roll-up device will serve where previously right and left devices are needed.

9 Claims, 12 Drawing Figures

FIG.1
FIG.2
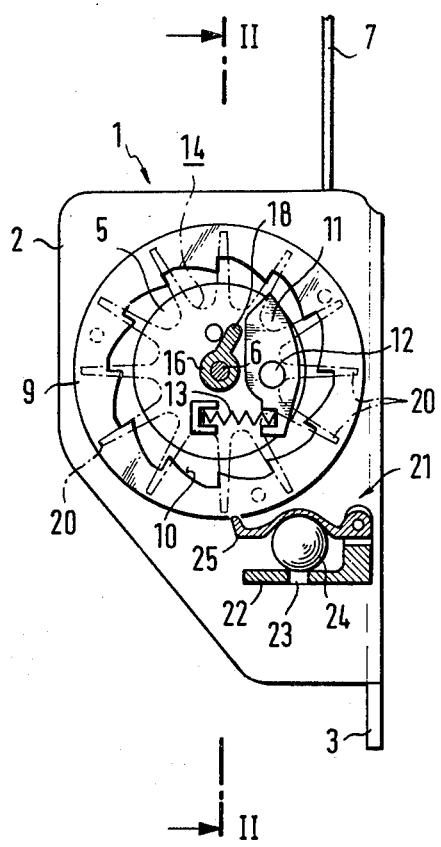
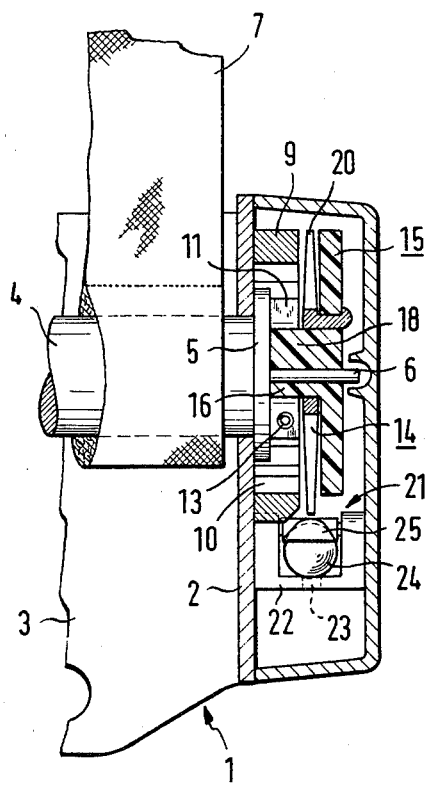

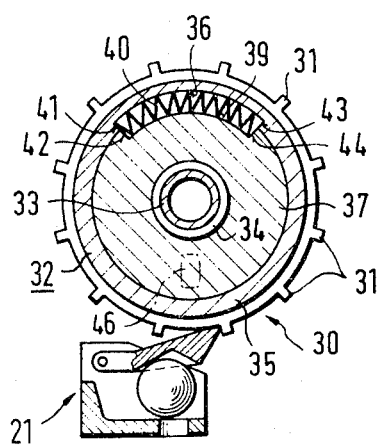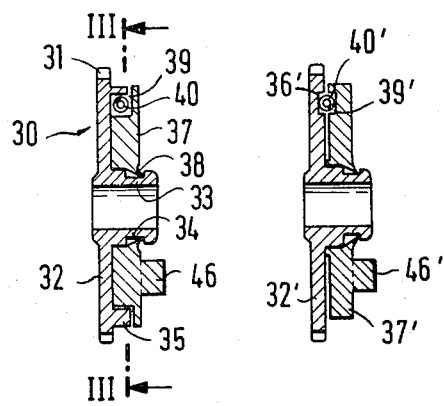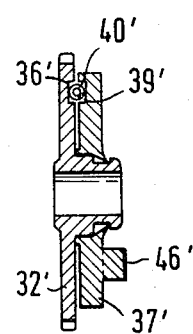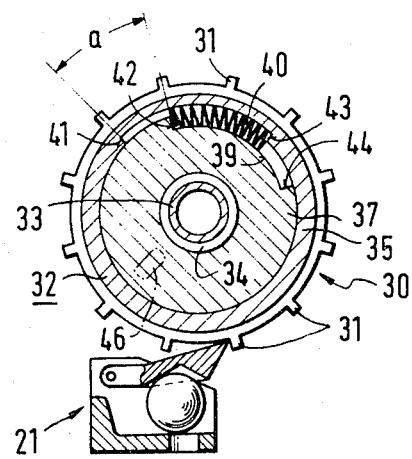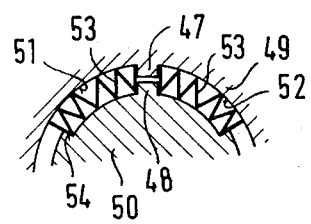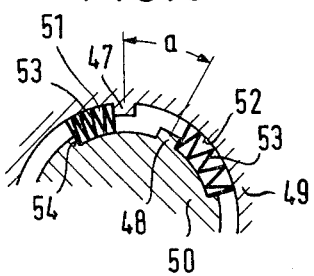

SAFETY BELT ROLL-UP DEVICE

BACKGROUND OF THE INVENTION

1. Field of the Invention

This invention relates to a safety belt roll-up device with an arrangement for blocking the belt reel in the event of danger, having a release mechanism for impeding a control disk with control teeth, preferably at the outer circumference, which disk is freely rotatable relative to the belt shaft. The device has a locking arrangement which can be actuated by the control disk, for blocking the belt reel.

2. Description of the Prior Art

In safety belt roll-up devices of this type, the purpose of the control disk is to initiate the activation of the locking device, i.e., the blocking of the roll-up device in such a manner that the control disk is arrested if the vehicle is decelerated, for instance, via a mechanical release mechanism, e.g., a so-called ball sensor. During the subsequent unwinding of the belt, the belt reel and the belt shaft rotate. Great emphasis is placed on the fact that this rotation is terminated by letting the blocking arrangement become effective after an angular travel distance as short as possible. To this end it is necessary that the control disk can execute a relative motion with respect to a predetermined starting position, for instance by the provision that the control disk is under the action of a spring and can be resiliently deflected only in one direction, whereupon it returns into the starting position. Such safety belt roll-up devices are fastened in a mirror-symmetrical arrangement to the oppositely located vehicle frames (right and left-hand installation), so that in the last described solution, control disks with different spring disposition would be required, which makes among other things quantity production of such safety belt roll-up devices more difficult.

SUMMARY OF THE INVENTION

An object of the present invention is to provide a safety belt roll-up device of the type mentioned at the outset in which only a single roll-up device type is required for right and left-hand installation.

With the foregoing and other objects in view, there is provided in accordance with the invention a safety belt roll-up device with belt shaft blocking means having a frame, a rotatable belt shaft on which a belt is wound mounted in the frame, locking means with locking teeth and a locking pawl for blocking the belt shaft activated by a control disk which is freely rotatable relative to the belt shaft and has control teeth, a release mechanism which is triggered when the vehicle exceeds a permissible acceleration or deceleration, for impeding rotation of the control disk, a cam associated coaxially with the control disk with the cam rotatable relative to the control disk, said cam having an actuating dog for activating the locking means, and said dog held in a predetermined starting position relative to the control disk by at least one spring which can be deflected resiliently relative to the control disk in opposite directions or rotation.

Other features which are considered as characteristic for the invention are set forth in the appended claims.

Although the invention is illustrated and described herein as embodied in a safety belt roll-up device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 diagrammatically illustrates in a side view a safety belt roll-up device showing a release mechanism control disk and locking means for only one installation, FIG. 2 is a partial cross section of the safety belt roll-up device taken along line II—II of FIG. 1, FIG. 3 and 4 illustrate a first embodiment of the control disk of the safety belt roll-up device according to the invention in two different positions of operation, i.e. in normal position and activated position taken along line III—III of FIG. 5, FIG. 5 is a sectional view of the control disk of FIG. 3, FIG. 6 is a variant of FIG. 5, FIGS. 7 and 8 illustrate a second embodiment of the control disk of the safety belt roll-up device according to the invention in two different positions of operation, FIG. 9 schematically shows a third embodiment of the control disk, FIGS. 10 and 11 schematically illustrate a fourth and fifth embodiment of the control disk.

DETAILED DESCRIPTION OF INVENTION

Figure 10:
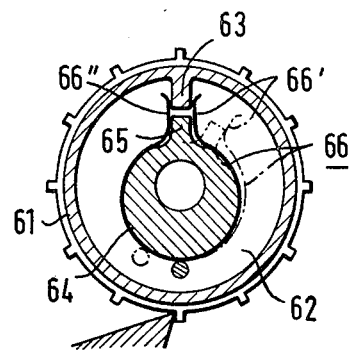

According to the invention, the control disk is associated coaxially with a cam which is rotatable relative to the control disk. The cam has an actuating dog for the locking device and is held in a predetermined starting position relative to the control disk by at least one spring and can be deflected resiliently in opposite directions of rotation relative to the control disk. In this manner, a single type of roll-up device can be used for right- and left-hand installation, since the control disks can be deflected resiliently in both possible directions of rotation and, when released, automatically returns to the starting position.

In an embodiment of the safety belt roll-up device according to the invention, which is particularly simple as fas as assembly is concerned and saves space, the cam is mounted freely rotatably on a bearing hub of the control disk and is axially secured by a stop, preferably by a resilient projection which can be hooked into a concentric circular slot in the hub. In this manner, the cam can be snapped onto the bearing hub of the control disk without effort in the assembly, so that no separate stop elements are required for securing same in the axial direction.

According to a further embodiment of the invention, the control disk and the cam are provided with recesses which face each other and together form one or several coaxial and arc-shaped receiving channels for the springs. Radially or axially aligned stops of the control disk and the cam are provided in the vicinity of the channels. The stops are held in the alignment or starting position by spring force.

The radially aligned stops of the control disk and the cam are preferably tensioned against each other by the free, projecting spring legs of a loop spring mounted on an axial hub part. This solution permits particularly large control distances.

In FIGS. 1 and 2, the housing 1 of a safety belt roll-up device which is made of a stable material, consists basically of two side plates 2 and a cross piece 3. Rotatably mounted in the side plates 2, of which only one is shown in the figures, is the belt shaft 4 which projects beyond the side plate 2 and has a planar radial end shoulder 5 as well as a thin cylindrical journal pin 6. The safety belt wound on the belt shaft 4 is designated by numeral 7. Fastened to the outside surface of the side plate 2 is a ratchet gear 9 with internal ratchet teeth 10. A two-arm ratchet pawl 11 on a bearing pin 12 is pivoted eccentrically to the belt shaft at the end face extension 5 of the belt shaft 4. In FIG. 1 the upper locking edge of this ratchet pawl 11 is pushed by a spring 13 toward the belt shaft. For the sake of clarity, a control disk 14 is shown only dashed in FIG. 1 and an inertial disk 15 connected to the control disk is not shown. The inertial disk 15 (FIG. 2) has a bearing extension 16 with a bearing hole. The bearing extension 16 carries integrally therewith a control dog 18. The control disk 14 provided with a corresponding bearing opening can be pushed with a positive engagement onto the bearing extension 16 and the control dog 18. The unit of control disk 14/inertial disk 15 is rotatably mounted relative to the belt shaft 4 on the journal pin 6 of the belt shaft 4. The control disk 14 has radial, narrow control teeth 20 which agree as to pitch and number of teeth with the ratchet teeth 10. A release mechanism designated generally by numeral 21 is in the form of a so-called ball sensor, consisting of a base plate 22 fastened to the housing of the automtic device, with a centering hole 23, a ball 24 and a tiltable control lever 25 lightly supported on the ball 24. The release mechanism 21 is actuated in the event of an excessive deceleration of the vehicle. Then, the ball 24 moves outside the area of the centering hole 23 with the result that the control lever 25 is pushed upward. This stops the control disk 14. The safety belt 7 is unwound slightly until the control dog 18 runs up on the inside surface of the ratchet pawl 11 due to the relative motion between th belt shaft 4 and the control disk 14. The ratchet pawl 11 then pushes against the ratchet teeth 10.

In the following, control disks which are different from the control disk according to FIGS. 1 and 2 are explained.

In the embodiment example according to FIGS. 3, 4 and 5, the control unit 30 has a flat control disk 32 with control teeth 31 arranged at its outer circumference and also has a bearing hub 33 with a concentric circular groove 34 as well as a collar 35. A circular recess 36 is provided in part of the collar 35. As clearly shown in FIGS. 3 and 5, a flat cam 37 is mounted freely rotatably on the bearing hub 33. This cam 37 has a resilient projection 38 which can be hooked resiliently into the concentric circular groove 34 when the cam is placed on the bearing hub, thereby axially securing the cam. The cam 37, similar to the control disk 32, also has a circular-arc-shaped recess 39. The recesses 36, 39 of the control disk and the cam, radially offset from each other, form a closed receiving channel 36/39 for a compression spring 40. The shoulders of the recesses 36 and 39, terminating the circular arc of the receiving channel at both ends, form radially aligned stops 41, 42 and 43, 44, which are tensioned against each other by the two ends of the spring 40 contained in the receiving channel 36/39. When the release mechanism 21 becomes effective and gets into the blocking position, it locks the control disk 32 by contact at the control teeth 31.

The initial or starting position is shown in FIG. 3, while in FIG. 4 that position is shown in which some belt 7 was unwound from shaft 4 and the blocking of the automatic device, i.e., the blocking of the belt shaft 4, completed. It is seen clearly that in this process the stops 41 and 42, 43 and 44 of the control disk and the cam have shifted clockwise relative to each other by the angle a. With the release of the control unit 30, i.e. it is no longer activated by release mechanism 21, the tensioned spring 40 again brings the corresponding stops into alignment (starting position). While the control unit 30 was being actuated, the ratchet pawl designated with 11 in FIGS. 1 and 2 was moved into the locking position by means of the control dog 46 of the cam 37. The figures also clearly show that due to the particular manner of arranging the spring 40, a deflection of the cam 37 counterclockwise is also possible. Thereafter, upon release, the stops get into mutual alignment again.

The embodiment example according to FIG. 6 differs from the embodiment example according to FIGS. 3 to 5 in that the control disk 32' and cam 37' are provided with axially opening recesses 36' and 39' as well as with axially aligned stops for the spring 40'.

In the embodiment example according to FIGS. 7 and 8, there is located, on both sides of each of the stops 47 and 48 of the control disk 49 and the cam 50, a circular-arc-shaped receiving channel 51 and channel 52 for receiving a spring 53 each. The springs 53 are braced against the radially aligned stops 47, 48 as well as at the other end against the corresponding shoulders 54 defining the receiving channels, of the cam 50. Here, too, a relative motion of the control disk and the cam, for instance, by the angle a clockwise as well as counterclockwise is possible, as shown in FIG. 8. The stops 47 and 48 are pushed back into their alignment or starting position after the load ceases.

Figure 9:
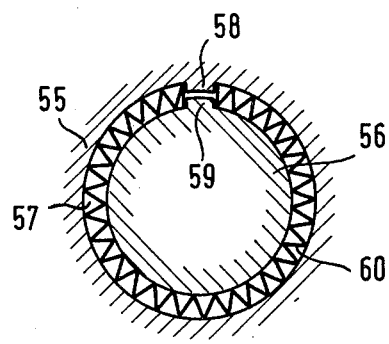

In the embodiment examples according to FIG. 9, annular recesses are provided in the control disk 55 and the cam 56, which form an annular receiving channel 57 of the control disk 55 and the cam 56, with the exception of the stops 58, 59, arranged in the area of the receiving channel 57 and radially aligned with each other. The spring ends of a single spring 60, bent in the form of a ring, are braced against these stops.

In the embodiment example according to FIG. 10, a control disk 61 has a stop 63 which projects into a recessed cavity 62, while the cam 64 which is coaxial with the control disk 61 and cooperates therewith, has a stop 65 facing the stop 63. Mounted on a hub part or on the outer circumference of the cam 64 is a formed spring 66 with two radially projecting free spring legs 66' and 66'', which are braced against the radially aligned stops 63 and 65 and tension them against each other. Here too, a relative motion in both directions of rotation is possible, the dash-dotted lines indicating the actuated position of the cam after a relative motion.

Figure 11:
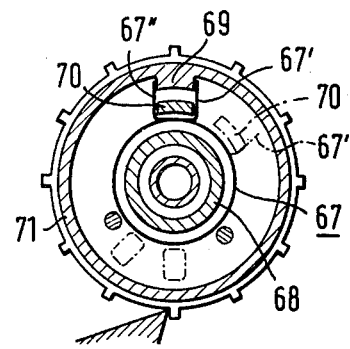
Figure 12:
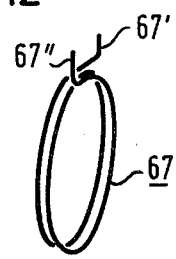
FIG. 12 shows the loop from FIG. 11 in detail.

In the embodiment example according to FIGS. 11 and 12, a loop spring 67, shown as a detail in FIG. 12, is mounted on a hub part of the cam 68 with several spring turns instead of the formed spring according to FIG. 10. The freely projecting spring legs 67' and 67'' tension the stops 69 and 70 of the cam 68 and the control disk 71 against each other. Here, too, the deflected position of the cam 68 or the stop 70 of the cam 68 is indicated.

FIG. 1 and 2 do not show the invention, but only show the mode of operation of a roll-up device for a safety belt which is provided with a control disk 14 for activating the lock (ratchet pawl 11, locked with teeth 10). The control disk is differently constructed from the one shown in FIGS. 3-12. The same effect in FIG. 1,2 and FIGS. 3-12 is the fact that, in both cases, the control disk is supported freely rotatably with respect to the belt shaft 4 on an extension of the shaft, for example, 6 in FIG. 2 and that the control dog 18, respectively 46, of the stopped control disk runs-up against the locking pawl 11 when the release mechanism is released, whereby the locking pawl 11 which is eccentrically disposed on the belt shaft, and continues to even turn after the control disk 14 has stopped is pressed into the locking position against the spring force 13. This means that the locking is effected only after the dog 18, 46 has performed a relative rotation with respect to the belt shaft 6. For this reason the controldisk 14, respectively 32, must not be in firm fixed connection with the belt shaft 6, because otherwise this relative rotation would not be possible.

When the release mechanism 21 is in its rest postion, the control disk 14, 32 can turn on the belt shaft together with the cam 37, so that no locking takes place, and the belt can be pulled out freely. Hereby the dog 18, 46 contacts the locking pawl 11 without moving it. Only when the control disk 32 stops, said control disk and thereby also the cam 37 which is connected with the latter by a spring 40, cannot turn any more with the belt shaft 6, and the locking pawl 11 hits the control dog 18, 46, and is swung into the lock position where it engages the locking teeth 10. Because the inner- or lock teeth 10 are stationary, stopping of the control disc and the beginning of the swinging motion of the locking pawl can occur at different angular positions, i.e. the rotational angle of the pawl 11 to the nearest stationary tooth 10 can be large or small. It may also happen that the point of the locking pawl hits the tip of the tooth 10, and the engagement is effected at the second next tooth. Now if the dog 18, 46 could not yield elastically, at a large angular motion the rigid parts, i.e. the rigid control dog and also rigid, control disk, the locking pawl when firmly lies against the control dog and the stationary teeth, would crash against each other, and the damaging of the mentioned parts would result.

In order to avoid this according to the invention, the control dog 46 according to FIGS. 3-6, together with the cam 37 are arranged springy rotatably with respect to the control disk which is provided with rigid teeth. Thereby it is made possible that the control dog 46 can elastically yield, for example, at the angular tooth-on tooth position, whereafter it falls reliably into the next tooth due to the tensioned spring 40 and the elastic pressure.

According to the invention, the cam disk can elastically yield in two opposite directions with respect to the control disk in all figures. This is required if the control disk is mounted, either according to FIG. 2 on one side, or at the other side of belt shaft 4, because then the control-rotational direction is reversed.

There are claimed:

1. Safety belt roll-up device with belt shaft blocking means having a frame, a rotatable belt shaft on which a belt is wound mounted in the frame, blocking means with stationary locking teeth and a locking pawl attached to and rotatable with the belt shaft, said pawl being moveable to engage the stationary locking teeth for blocking the belt shaft, a control disk with a control teeth at its periphery for activating said blocking means to effect blocking of the belt shaft, said disk freely rotatable relative to the belt shaft but constrained to rotate with said belt shaft by said locking pawl, a release mechanism which is triggered when the vehicle exceeds a permissible acceleration or deceleration, for impeding rotation of the control disk by contact with said control teeth, a cam mounted coaxially with the control disk with the cam rotatable relative to the control disk in opposite directions of rotations, stop means to permit only a part turn of the cam in either direction of rotation relative to the control disk, said cam having an actuating dog for activating the blocking means by contacting said locking pawl when the cam and disk rotate at a speed different from the shaft causing the pawl to move into engagement with the locking teeth, and said dog held in a predetermined starting position relative to the control disk by at least one spring which can be deflected resiliently relative to the control disk in opposite directions of rotation.

2. Safety belt roll-up device according to claim 1, further including a bearing hub of the control disk on which said cam is mounted and freely rotatable and is axially secured by a stop element.

3. Safety belt roll-up device according to claim 2, wherein the stop element is a resilient projection which can be hooked into a concentric circular slot in the hub.

4. Safety belt roll-up device according to claim 1, wherein the control disk and the cam are provided with recesses facing each other and together forming a coaxial and arc-shaped receiving channel, said spring being disposed in said receiving channel, aligned stops for the control disk and the cam, said control disk and cam held in the aligned or starting position by the spring force of said spring.

5. Safety belt roll-up device according to claim 4, wherein the recesses of the control disk and the cam facing each other radially or axially together form a circular-arc shaped receiving channel, and wherein shoulders terminating the arc at both ends form the aligned stops which are tensioned against each other by said spring contained in the receiving channel.

6. Safety belt roll-up device according to claim 4, wherein a circular-arc shaped receiving channel is provided on both sides of each stop of the control disk and cam for receiving two springs, which springs are braced resiliently against the stops.

7. Safety belt roll-up device according to claim 4, wherein the recess is a concentric, annular receiving channel with a stop of the control disk and the cam in the area of the channel, against which stop the spring ends of a single spring are braced.

8. Safety belt roll-up device according to claim 2, wherein radially aligned stops of the control disk and the cam are normally retained in alignment by a formed spring mounted on an axial hub part.

9. Safety belt roll-up device according to claim 2, wherein aligned stops of the control disk and the cam are normally retained in alignment by free projecting spring legs of a loop spring which is mounted with several spring turns on an axial hub part of said cam.

* * * * *